United States Patent
Kim et al.

(10) Patent No.: US 9,459,012 B2
(45) Date of Patent: Oct. 4, 2016

(54) THERMAL ENERGY NETWORK SYSTEM

(75) Inventors: Minsung Kim, Daejeon (KR);
Young-Jin Baik, Daejeon (KR);
Seong-Ryong Park, Daejeon (KR);
Dong-Won Lee, Daejeon (KR);
Ho-Sang Ra, Daejeon (KR);
Young-Soo Lee, Seoul (KR); Ki-Chang Chang, Daejeon (KR); Joung-Son Woo, Daejeon (KR); Jun-Tack Park, Daejeon (KR); Hyung-Kee Yoon, Daejeon (KR); Euy-Joon Lee, Daejeon (KR); Eun-Chul Kang, Daejeon (KR)

(73) Assignee: KOREA INSTITUTE OF ENERGY RESEARCH, Daejeon (KR)

( * ) Notice: Subject to any disclaimer, the term of this patent is extended or adjusted under 35 U.S.C. 154(b) by 344 days.

(21) Appl. No.: 13/981,210

(22) PCT Filed: Aug. 8, 2012

(86) PCT No.: PCT/KR2012/006310
§ 371 (c)(1),
(2), (4) Date: Jul. 23, 2013

(87) PCT Pub. No.: WO2013/062219
PCT Pub. Date: May 2, 2013

(65) Prior Publication Data
US 2013/0299126 A1    Nov. 14, 2013

(30) Foreign Application Priority Data
Oct. 27, 2011  (KR) .......... 10-2011-0110236

(51) Int. Cl.
*F24D 10/00*    (2006.01)
*F24D 15/00*    (2006.01)
(Continued)

(52) U.S. Cl.
CPC .............. *F24D 15/00* (2013.01); *F24D 10/00* (2013.01); *F24D 11/001* (2013.01);
(Continued)

(58) Field of Classification Search
CPC ............ F24D 11/001; F24D 11/0207; F24D 11/0235; F24D 10/003; F24D 10/006; F24D 2200/11; F24D 2200/14; F24D 2200/19; F24D 2200/28; F28D 20/00
See application file for complete search history.

(56) References Cited

U.S. PATENT DOCUMENTS

| 4,143,814 A | 3/1979 | Hill, Jr. |
| 4,883,087 A * | 11/1989 | Nielsen ................. F17D 5/02 |
| | | 137/458 |

(Continued)

FOREIGN PATENT DOCUMENTS

| DE | 102009024498 A1 * | 7/2010 | ............. F24D 10/00 |
| DE | 102009047908 A1 * | 8/2011 | |

(Continued)

OTHER PUBLICATIONS

Robert, District Energy and Combined Heat and Power, p. 19.*
(Continued)

*Primary Examiner* — Frantz Jules
*Assistant Examiner* — Nelson Nieves
(74) *Attorney, Agent, or Firm* — Paratus Law Group, PLLC

(57) ABSTRACT

Provided is a thermal energy network system including: a first thermal station that stores first thermal energy using a first heat source and supplies the first thermal energy to a first demand source used for residence or commerce; and a second thermal station that stores second thermal energy using a second heat source and supplies the second thermal energy to a second demand source used for industry, wherein the first thermal station and the second thermal station manage a base load of a thermal energy network, and the first thermal energy and the second thermal energy are transferred between the first thermal station and the second thermal station as needed.

14 Claims, 2 Drawing Sheets

(51) Int. Cl.
*F28D 20/00* (2006.01)
*F24D 11/00* (2006.01)
*F24D 11/02* (2006.01)

(52) U.S. Cl.
CPC ...... *F24D 11/0207* (2013.01); *F24D 11/0221* (2013.01); *F24D 11/0235* (2013.01); *F28D 20/00* (2013.01); *F24D 2200/11* (2013.01); *F24D 2200/14* (2013.01); *F24D 2200/19* (2013.01); *F24D 2200/28* (2013.01); *Y02B 10/20* (2013.01); *Y02B 10/40* (2013.01); *Y02B 10/70* (2013.01); *Y02B 30/126* (2013.01); *Y02B 30/52* (2013.01); *Y02E 20/12* (2013.01); *Y02E 20/14* (2013.01); *Y02E 60/142* (2013.01); *Y02P 80/14* (2015.11); *Y02P 80/24* (2015.11)

(56) References Cited

U.S. PATENT DOCUMENTS

| | | | |
|---|---|---|---|
| 5,697,551 A * | 12/1997 | Gataora | F24D 11/001 236/20 R |
| 2011/0140648 A1 | 6/2011 | Lee | |
| 2011/0203576 A1 | 8/2011 | Thoma | |
| 2012/0060501 A1 * | 3/2012 | Hemrle | F02C 1/10 60/645 |
| 2012/0080168 A1 * | 4/2012 | Hemrle | F01K 3/12 165/104.19 |

FOREIGN PATENT DOCUMENTS

| | | | | |
|---|---|---|---|---|
| EP | 2182296 A2 * | 5/2010 | | F24D 10/00 |
| JP | 06-341302 A | 12/1994 | | |
| JP | 2011-130655 A | 6/2011 | | |
| KR | 10-0852275 B1 | 8/2008 | | |
| KR | 10-2009-0002295 A | 1/2009 | | |
| KR | 10-0893828 B1 | 4/2009 | | |
| KR | 10-2009-0059389 A | 6/2009 | | |
| KR | 10-1015804 B1 | 2/2011 | | |
| KR | 10-2011-0021501 A | 3/2011 | | |
| NL | EP 0168084 A1 * | 1/1986 | | F24D 11/001 |
| NL | 1030257 C2 | 4/2007 | | |
| WO | WO 0179761 A1 * | 10/2001 | | |
| WO | WO 2010/058397 A1 | 5/2010 | | |
| WO | WO 2010/145040 A1 | 12/2010 | | |
| WO | WO 2010145040 A1 * | 12/2010 | | |

OTHER PUBLICATIONS

Direct Contact Heat Exchangers.*
European Search Report for EP Application No. 12 842 853.9 mailed Feb. 9. 2015 from European Patent Office.
International Search Report for PCT/KR2012/006310 mailed Feb. 20, 2013 from Korean Intellectual Property Office.

* cited by examiner

THERMAL ENERGY NETWORK SYSTEM

CROSS REFERENCE TO PRIOR APPLICATION

This application is a National Stage Patent Application of PCT International Patent Application No. PCT/KR2012/006310 (filed on Aug. 8, 2012) under 35 U.S.C. §371, which claims priority to Korean Patent Application No. 10-2011-0110236 (filed on Oct. 27, 2011), which are all hereby incorporated by reference in their entirety.

TECHNICAL FIELD

The present invention relates to a thermal energy network system, and more particularly, to a thermal energy network system that is capable of utilizing a distributed heat source and improving heat transportation efficiency.

BACKGROUND ART

Due to a worldwide concern about reduction in greenhouse gas, the development for medium-sized heat supply technology for utilizing new renewable energy heat sources with low temperatures that are scattered on the periphery, without using fossil fuel has been requested. Since a greater part of thermal demand from the center of a big city or surroundings is less than 100° C., it is very inefficient to directly use high-temperature and high-quality energy generated by combustion of fossil fuel. However, due to limitations in transportation and storage technology of thermal energy, technology development for thermal energy has been delayed compared to other energy sources.

Korean Patent Publication No. 2011-0021501 discloses a combined air conditioning system and a dual heat source supply system using new renewable energy as a heat source. However, the above technique is just the usage of new renewable energy instead of existing fossil fuel and has limitations in considering a thermal energy network considering a distributed heat source or heat transportation efficiency.

DETAILED DESCRIPTION OF THE INVENTION

Technical Problem

The present invention provides a thermal energy network system that is capable of utilizing a distributed heat source and improving heat transportation efficiency.

Technical Solution

According to an aspect of the present invention, there is provided a thermal energy network system including: a first thermal station that stores first thermal energy using a first heat source and supplies the first thermal energy to a first demand source used for residence or commerce; and a second thermal station that stores second thermal energy using a second heat source and supplies the second thermal energy to a second demand source used for industry, wherein the first thermal station and the second thermal station manage a base load of a thermal energy network, and the first thermal energy and the second thermal energy are transferred between the first thermal station and the second thermal station as needed.

According to another aspect of the present invention, there is provided a thermal energy network system including: a first thermal station that stores first thermal energy using a first heat source and supplies the first thermal energy to a first demand source used for residence or commerce, wherein the first thermal station is able to transport heat to the first demand source in a bidirectional manner so as to receive thermal energy from the first demand source and to store the thermal energy as needed and the first thermal station is installed adjacent to the first demand source; a second thermal station that stores second thermal energy using a second heat source and supplies the second thermal energy to a second demand source used for industry, wherein the second thermal station is able to transport heat to the second demand source in a bidirectional manner so as to receive thermal energy from the second demand source and to store the thermal energy as needed and the second thermal station is installed adjacent to the second demand source; and district heating equipment that supplies thermal energy to the first demand source or the second demand source, wherein the first thermal station and the second thermal station manage a base load of a thermal energy network, and the district heating equipment manages a partial load of the thermal energy network.

According to another aspect of the present invention, there is provided a thermal energy network system including: a first thermal station that stores first thermal energy using a first heat source and supplies the first thermal energy to a first demand source used for residence or commerce, wherein the first thermal station is able to transport heat to the first demand source in a bidirectional manner so as to receive thermal energy from the first demand source and to store the thermal energy as needed and the first thermal station is installed adjacent to the first demand source; and a second thermal station that stores second thermal energy using a second heat source and supplies the second thermal energy to a second demand source used for industry, wherein the second thermal station is able to transport heat to the second demand source in a bidirectional manner so as to receive thermal energy from the second demand source and to store the thermal energy as needed and the second thermal station is installed adjacent to the second demand source, wherein the first thermal energy and the second thermal energy are transferred between the first thermal station and the second thermal station as needed.

Advantageous Effects

A thermal energy network system according to the present invention has the following effects.

First, each of a first thermal station and a second thermal station can supply necessary thermal energy to each of a first demand source and a second demand source, and bidirectional thermal energy movement between the first thermal station and the second thermal station can be performed so that thermal energy availability can be improved.

Second, since the first thermal station and the second thermal station are placed adjacent to the first demand source and the second demand source, costs for heat transportation of thermal energy can be reduced.

Third, since bidirectional thermal energy movement between the first thermal station and the first demand source and between the second thermal station and the second demand source can be performed, the usage of a distributed heat source at the first demand source and the second demand source is efficient.

Fourth, since the first thermal station and the second thermal station manage a base load and district heating equipment manages a partial load, heat transportation costs can be reduced, and new renewable energy as a heat source with a low temperature can be utilized.

BEST MODE OF THE INVENTION

Figure 1:
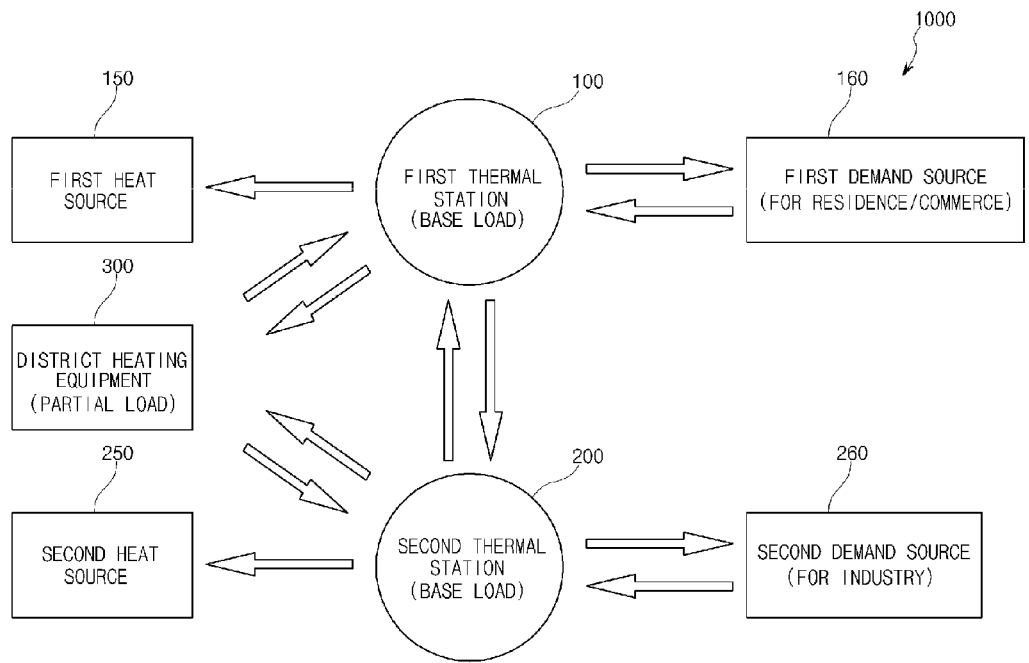
FIG. 1 is a view schematically illustrating a thermal energy network system according to an embodiment of the present invention.
Figure 2:
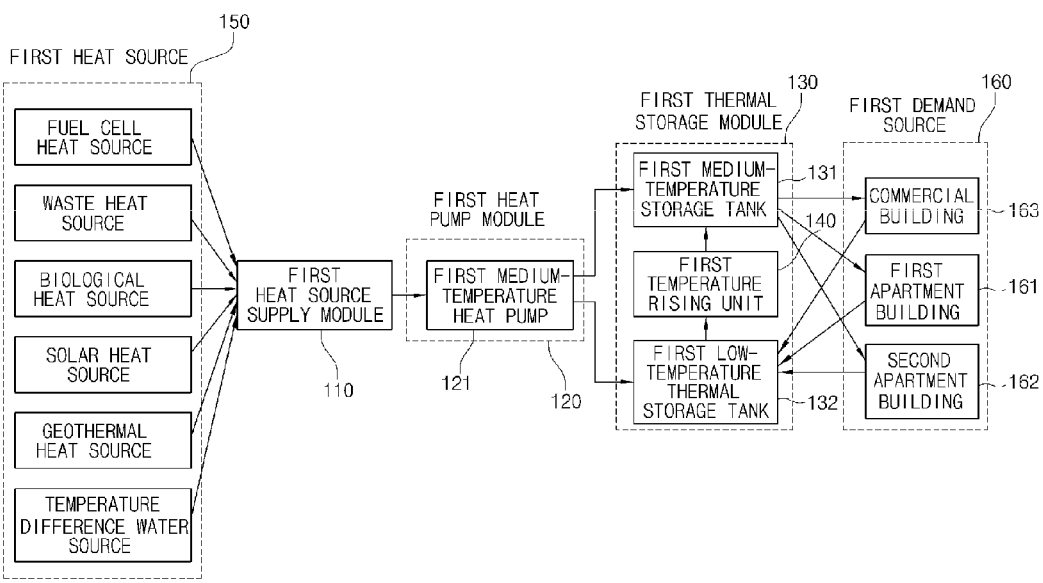
FIG. 2 is a view illustrating a detailed structure of a first thermal station illustrated in FIG. 1.
Figure 3:
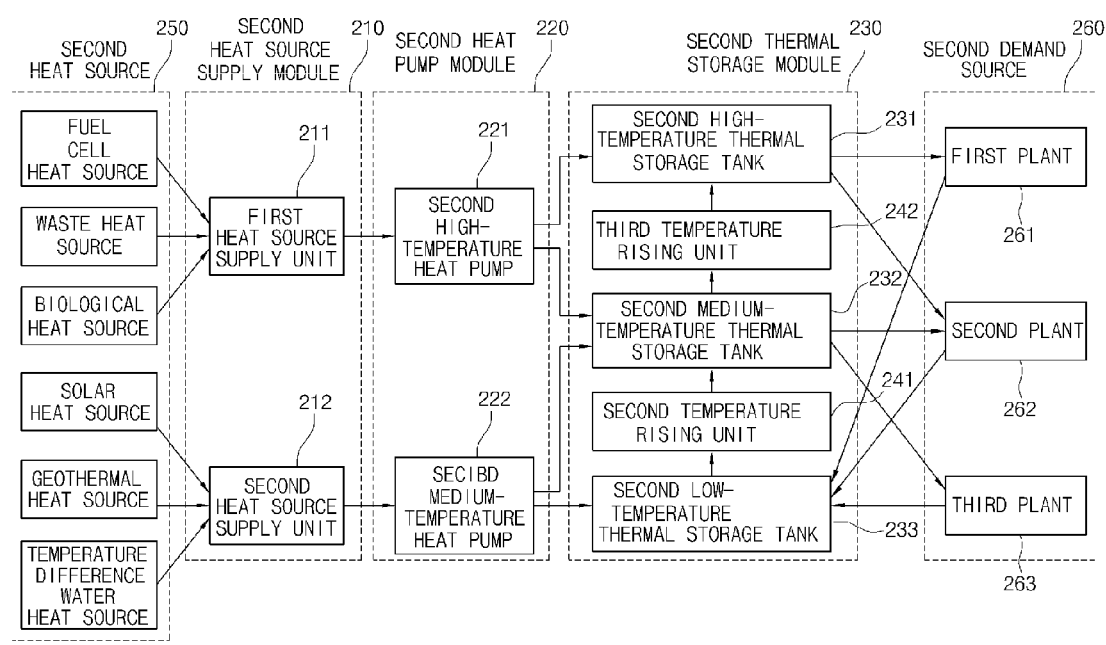
FIG. 3 is a view illustrating a detailed structure of a second thermal station illustrated in FIG. 1.

A schematic structure of a thermal energy network system 1000 according to an embodiment of the present invention is shown in FIGS. 1 through 3. Referring to FIGS. 1 through 3, the thermal energy network system 1000 includes a first thermal station 100, a second thermal station 200, and district heating equipment 300.

The first thermal station 100 stores first thermal energy using a first heat source 150 and supplies the first thermal energy to a first demand source 160 used for residence and commerce. The second thermal station 200 stores second thermal energy using a second heat source 250 and supplies the second thermal energy to a second demand source 260 used for commerce. The district heating equipment 300 is a combined heat and power plant based on fossil energy and generation plant or a combined thermal power plant.

The first heat source 150 or the second heat source 250 is a heat source with various levels of temperature, such as a new renewable energy source, and has a relatively low temperature than fossil fuel. This type of heat source includes a fuel cell heat source, a waste heat source, a biological heat source, a solar heat source, a geothermal heat source, and a temperature difference water heat source.

The first demand source 160 includes first and second apartment buildings 161 and 162, and a commercial building 163. The second demand source 260 includes a first plant 261 that performs high-temperature and medium-temperature processes, a second plant 262 that performs a high-temperature process, and a third plant 263 that performs a medium-temperature process.

The first thermal station 100 is placed adjacent to the first demand source 160, and the second thermal station 200 is placed adjacent to the second demand source 260. The district heating equipment 300 supplies high-temperature water of more than 100° C. using heat generated by combustion of fossil energy. In reality, heat required by a demand source that utilizes district heating is low-temperature heat of about 60° C. However, when heat is transported at the low temperature, a large amount of supply flow is required, which increases costs required for heat transportation, and an operation of district heating is performed to reduce supply flow instead of raising a supply temperature to 110° C. However, since the first thermal station 100 is installed adjacent to the first demand source 160, heat transportation costs are low, and the first thermal station 100 can supply hot water with a temperature directly required by the first demand source 160. Also, since the second thermal station 200 is installed adjacent to the second demand source 260, the second thermal station 200 can supply hot water with a temperature directly required by the second demand source 260. Detailed configurations of the first thermal station 100 and the second thermal station 200 will be described below.

The first thermal station 100, the second thermal station 200, the district heating equipment 300, the first heat source 150, the second heat source 250, the first demand source 160, and the second demand source 260 constitute a thermal energy network. Here, the first thermal station 100 and the second thermal station 200 can supply hot water with a relatively low temperature and can use a new renewable energy source and thus manage a base load of the thermal energy network. In addition, the district heating equipment 300 manages a partial load of the thermal energy network.

Thermal energy is movable between the first thermal station 100 and the second thermal station 200 as needed. Thermal energy is movable between the first thermal station 100 and the district heating equipment 300 and between the second thermal station 200 and the district heating equipment 300 in a bidirectional manner. Thus, in the thermal energy network, non-efficiency caused by heat transportation is reduced, and availability of the new renewable energy greatly increases. Also, even when the new renewable energy is used, the thermal energy can be stably supplied to the first demand source 160 and the second demand source 260. Furthermore, the thermal energy is movable between the first thermal station 100 and the first demand source 160 in a bidirectional manner, and the thermal energy is movable between the second thermal station 200 and the second demand source 260 in a bidirectional manner and thus a distributed heat source can be utilized.

Hereinafter, the first thermal station 100 and the second thermal station 200 will be described in detail.

Referring to FIG. 2, the first thermal station 100 includes a first heat source supply module 110, a first heat pump module 120, a first thermal storage module 130, and a first temperature rising unit 140. The first heat pump module 120 includes a large-capacity first medium-temperature heat pump 121. The first medium-temperature heat pump 121 produces the first thermal energy using the first heat source 150. The first thermal energy is medium-temperature hot water and low-temperature hot water.

The first thermal storage module 130 includes a first medium-temperature thermal storage tank 131 and a first low-temperature thermal storage tank 132. Medium-temperature hot water produced by the first medium-temperature heat pump 121 is stored in the first medium-temperature thermal storage tank 131, and low-temperature hot water produced by the first medium-temperature heat pump 121 is stored in the first low-temperature thermal storage tank 132. The first temperature rising unit 140 raises the temperature of low-temperature hot water in the first low-temperature thermal storage tank 132 using various energies including electric energy and stores the hot water, a temperature of which has risen, in the first medium-temperature thermal storage tank 131.

As described above, the first heat source 150 includes heat sources with various levels of temperature. The first heat source supply module 110 selectively introduces a heat source from one or a plurality of heat sources among the heat sources and produces a heat source with a temperature requested by the first medium-temperature heat pump 121.

The commercial building 163 and the first apartment building 161 among the first demand source 160 receives medium-temperature hot water from the first medium-temperature thermal storage tank 131 and then recirculates low-temperature hot water to the first low-temperature thermal storage tank 132. The second apartment building 162 of the first demand source 160 receives the low-temperature hot water from the first low-temperature thermal storage tank 132 and then recirculates hot water with a lower temperature than the low-temperature hot water to the first low-temperature thermal storage tank 132. However, the hot water that is independently produced by the first demand source 160 may be stored in the first medium-temperature thermal storage tank 131 or the first low-temperature thermal storage tank 132. Thus, the thermal energy is movable between the first demand source 160 and the first thermal station 100 in a bidirectional manner and thus a distributed heat source structure can be established at the first demand source 160.

Referring to FIG. 3, the second thermal station 200 includes a second heat source supply module 210, a second heat pump module 220, a second thermal storage module 230, a second temperature rising unit 241, and a third temperature rising unit 242. The second heat pump module 220 includes a large-capacity second high-temperature heat pump 221 and a large-capacity second medium-temperature heat pump 222. The second high-temperature heat pump 221 and the second medium-temperature heat pump 222 produce the second thermal energy using the second heat source 250. The second thermal energy is high-temperature hot water, medium-temperature hot water, or low-temperature hot water.

The second thermal storage module 230 includes a second high-temperature thermal storage tank 231, a second medium-temperature thermal storage tank 232, and a second low-temperature thermal storage tank 233 High-temperature hot water and medium-temperature hot water produced by the second high-temperature heat pump 221 are stored in the second high-temperature thermal storage tank 231 and the second medium-temperature thermal storage tank 232, respectively. The medium-temperature hot water produced by the second medium-temperature heat pump 222 is stored in the second medium-temperature thermal storage tank 232, and the low-temperature hot water produced by the second medium-temperature heat pump 222 is stored in the second low-temperature thermal storage tank 233. The second temperature rising unit 241 raises the temperature of the low-temperature hot water in the second low-temperature thermal storage tank 233 using various energies including electric energy and stores the hot water, the temperature of which has risen in the second medium-temperature thermal storage tank 232. The third temperature rising unit 242 raises the temperature of the medium-temperature hot water in the second medium-temperature thermal storage tank 232 and stores the hot water, the temperature of which has risen, in the second high-temperature thermal storage tank 231.

As described above, the second heat source 250 includes heat sources with various levels of temperature, and the second heat source supply module 210 includes a first heat source supply unit 211 and a second heat source supply unit 212. The first heat source supply unit 211 selectively introduces a heat source from one or a plurality of heat sources among the heat sources and produces a heat source with a temperature requested by the second high-temperature heat pump 221. The second heat source supply unit 212 selectively introduces a heat source from one or a plurality of heat sources among the heat sources and produces a heat source with a temperature requested by the second medium-temperature heat pump 222.

The first plant 261 of the second demand source 260 receives high-temperature hot water from the second high-temperature thermal storage tank 231 and then recirculates low-temperature hot water to the second low-temperature thermal storage tank 233. The second plant 262 receives high-temperature hot water and medium-temperature hot water from the second high-temperature thermal storage tank 231 and the second medium-temperature thermal storage tank 232, uses them and then recirculates the low-temperature hot water to the second low-temperature thermal storage tank 233. The third plant 263 receives medium-temperature hot water from the second medium-temperature thermal storage tank 232 and then recirculates the low-temperature hot water to the second low-temperature thermal storage tank 233. However, the hot water that is independently produced by the second demand source 260 may be stored in the second high-temperature thermal storage tank 231, the second medium-temperature thermal storage tank 232, or the second low-temperature thermal storage tank 233. Thus, the thermal energy is movable between the second demand source 260 and the second thermal station 200 in a bidirectional manner and thus a distributed heat source structure can be established at the second demand source 260.

While the present invention has been particularly shown and described with reference to exemplary embodiments thereof, it will be understood by those of ordinary skill in the art that various changes in form and details may be made therein without departing from the spirit and scope of the present invention as defined by the following claims.

INDUSTRIAL APPLICABILITY

By using a thermal energy network system according to the present invention, a thermal energy network of a residence facility, a commercial facility, and an industrial facility can be established.

The invention claimed is:
1. A thermal energy network system comprising:
a first thermal station that stores first thermal energy using a first heat source and supplies the first thermal energy to a first demand source used for residence or commerce, the first thermal station comprising a first heat source supply module, a first heat pump module, and a first thermal storage module,
wherein the first heat source supply module selectively introduces the first heat source and produces the first thermal energy with a first temperature requested by a first medium-temperature heat pump which is comprised of the first heat pump module;
a second thermal station that stores second thermal energy and third thermal energy using a second heat source and supplies the second thermal energy and the third thermal energy to a second demand source used for industry, the second thermal station comprising a second heat source supply module including a first heat source supply unit and a second heat source supply unit, a second heat pump module, and a second thermal storage module,
wherein the first heat source supply unit and the second heat source supply unit selectively introduce the second heat source and produce the second thermal energy with a second temperature requested by a second high-temperature heat pump and selectively introduce the second heat source and produce the third thermal energy with a third temperature requested by a second medium-temperature heat pump, respectively,
wherein the second high-temperature heat pump and the second medium-temperature heat pump are comprised of the second heat pump module,
wherein the first thermal station and the second thermal station manage a base load of a thermal energy network, and the first thermal energy and the second thermal energy are directly transferred in a bidirec- tional manner between the first thermal station and the second thermal station as needed, wherein the first thermal storage module in which the first thermal energy is stored comprises a first medium-temperature thermal storage tank that stores medium-temperature hot water produced by the first medium-temperature heat pump and a first low-temperature thermal storage tank that stores low-temperature hot water produced by the first medium-temperature heat pump, and wherein the second thermal storage module in which the second thermal energy and the third thermal energy are stored comprises a second high-temperature thermal storage tank that stores high-temperature hot water produced by the second high-temperature heat pump, a second medium-temperature thermal storage tank that stores medium-temperature hot water produced by the second high-temperature heat pump or the second medium-temperature heat pump, and a second low-temperature thermal storage tank that stores low-temperature hot water produced by the second medium-temperature heat pump; and a district heating equipment storing a district thermal energy, which manages a partial load of the thermal energy network, wherein the district thermal energy is directly exchanged between the district heating equipment and at least one of the first thermal station and the second thermal station.

2. The thermal energy network system of claim 1, wherein
the first thermal station is installed adjacent to the first demand source, and
the second thermal station is installed adjacent to the second demand source.

3. The thermal energy network system of claim 1, wherein the first thermal storage module exchanges hot water with the first demand source as needed.

4. The thermal energy network system of claim 1, wherein the first heat source comprises a plurality of heat sources with different levels of temperature.

5. The thermal energy network system of claim 4, wherein the first heat source supply module selectively introduces the first heat source from one or more of the plurality of heat sources among the first heat source with different levels of temperature.

6. The thermal energy network system of claim 4, wherein the first heat source comprises at least two selected from the group consisting of a fuel cell heat source, a solar heat source, a geothermal heat source, a waste heat source, a biological heat source, and a temperature difference water heat source.

7. The thermal energy network system of claim 1, wherein the first thermal station further comprises a first medium-temperature temperature rising unit that raises a temperature of hot water of the first low-temperature thermal storage tank and stores the hot water, the temperature of which has risen, in the first medium-temperature thermal storage tank.

8. The thermal energy network system of claim 1, wherein the second thermal storage module exchanges hot water with the second demand source as needed.

9. The thermal energy network system of claim 1, wherein the second heat source comprises a plurality of heat sources with different levels of temperature.

10. The thermal energy network system of claim 9, wherein the second heat source supply module selectively introduces the second heat source from one or more of the plurality of heat sources among the second heat source with different levels of temperature.

11. The thermal energy network system of claim 9, wherein the second heat source comprises at least two selected from the group consisting of a fuel cell heat source, a solar heat source, a geothermal heat source, a waste heat source, a biological heat source, and a temperature difference water heat source.

12. The thermal energy network system of claim 1, wherein the second thermal station comprises:
a second medium-temperature rising unit that raises a temperature of hot water of the low-temperature thermal storage tank and stores hot water, the temperature of which has risen, in the medium-temperature thermal storage tank; and
a second high-temperature rising unit that raises a temperature of hot water of the medium-temperature thermal storage tank and stores hot water, the temperature of which has risen, in the high-temperature thermal storage tank.

13. A thermal energy network system comprising:
a first thermal station that stores first thermal energy using a first heat source and supplies the first thermal energy to a first demand source used for residence or commerce, wherein the first thermal station transports heat to the first demand source in a bidirectional manner so as to receive thermal energy from the first demand source and to store the thermal energy as needed and the first thermal station is installed adjacent to the first demand source, the first thermal station comprising a first heat source supply module, a first heat pump module, and a first thermal storage module,
wherein the first heat source supply module selectively introduces of the first heat source and produces the first thermal energy with a first temperature requested by a first medium-temperature heat pump which is comprised of the first heat pump module;
a second thermal station that stores second thermal energy and third thermal energy using a second heat source and supplies the second thermal energy and the third thermal energy to a second demand source used for industry, wherein the second thermal station transports heat to the second demand source in a bidirectional manner so as to receive thermal energy from the second demand source and to store the thermal energy as needed and the second thermal station is installed adjacent to the second demand source, the second thermal station comprising a second heat source supply module including a first heat source supply unit and a second heat source supply unit, a second heat pump module, and a second thermal storage module,
wherein the first heat source supply unit and the second heat source supply unit selectively introduce the second heat source and produce the second thermal energy with a second temperature requested by a second high-temperature heat pump and selectively introduce the second heat source and produce the third thermal energy with a third temperature requested by a second medium-temperature heat pump, respectively,
wherein the second high-temperature heat pump and the second medium-temperature heat pump are comprised of the second heat pump module,
wherein the first thermal storage module in which the first thermal energy is stored comprises a first medium-temperature thermal storage tank that stores medium-temperature hot water produced by the first medium-temperature heat pump and a first low-temperature thermal storage tank that stores low-temperature hot water produced by the first medium-temperature heat pump, and wherein the second thermal storage module in which the second thermal energy and the third thermal energy are stored comprises a second high-temperature thermal storage tank that stores high-temperature hot water produced by the second high-temperature heat pump, a second medium-temperature thermal storage tank that stores medium-temperature hot water produced by the second high-temperature heat pump or the second medium-temperature heat pump, and a second low-temperature thermal storage tank that stores low-temperature hot water produced by the second medium-temperature heat pump; and a district heating equipment that supplies a district thermal energy to the first demand source or the second demand source, wherein the first thermal station and the second thermal station manage a base load of a thermal energy network, and the district heating equipment manages a partial load of the thermal energy network.

14. A thermal energy network system comprising:

a first thermal station that stores first thermal energy using a first heat source and supplies the first thermal energy to a first demand source used for residence or commerce, wherein the first thermal station transports heat to the first demand source in a bidirectional manner so as to receive thermal energy from the first demand source and to store the thermal energy as needed and the first thermal station is installed adjacent to the first demand source, the first thermal station comprising a first heat source supply module, a first heat pump module, and a first thermal storage module, wherein the first heat source supply module selectively introduces of the first heat source and produces the first thermal energy with a first temperature requested by a first medium-temperature heat pump which is comprised of the first heat pump module; and a second thermal station that stores second thermal energy and third thermal energy using a second heat source and supplies the second thermal energy and the third thermal energy to a second demand source used for industry, wherein the second thermal station transports heat to the second demand source in a bidirectional manner so as to receive thermal energy from the second demand source and to store the thermal energy as needed and the second thermal station is installed adjacent to the second demand source, the second thermal station comprising a second heat source supply module including a first heat source supply unit and a second heat source supply unit, a second heat pump module, and a second thermal storage module, wherein the first heat source supply unit and the second heat source supply unit selectively introduce the second heat source and produce the second thermal energy with a second temperature requested by a second high-temperature heat pump and selectively introduce the second heat source and produce the third thermal energy with a third temperature requested by a second medium-temperature heat pump, respectively, wherein the second high-temperature heat pump and the second medium-temperature heat pump are comprised of the second heat pump module, wherein the first thermal storage module in which the first thermal energy is stored comprises a first medium-temperature thermal storage tank that stores medium-temperature hot water produced by the first medium-temperature heat pump and a first low-temperature thermal storage tank that stores low-temperature hot water produced by the first medium-temperature heat pump, wherein the second thermal storage module in which the second thermal energy and the third thermal energy are stored comprises a second high-temperature thermal storage tank that stores high-temperature hot water produced by the second high-temperature heat pump, a second medium-temperature thermal storage tank that stores medium-temperature hot water produced by the second high-temperature heat pump or the second medium-temperature heat pump, and a second low-temperature thermal storage tank that stores low-temperature hot water produced by the second medium-temperature heat pump, and wherein the first thermal energy and the second thermal energy are transferred between the first thermal station and the second thermal station as needed.

* * * * *